United States Patent [19]

Hsu et al.

[11] Patent Number: 5,541,908
[45] Date of Patent: Jul. 30, 1996

[54] ACTUATOR HAVING A MINIMIZED PAYLOAD IN A OPTICAL RECORDING SYSTEM

[75] Inventors: Sunny K. Hsu, Sunnyvale; Charles B. Abate, San Jose, both of Calif.

[73] Assignee: Maxoptix Corporation, Fremont, Calif.

[21] Appl. No.: 312,501

[22] Filed: Sep. 26, 1994

Related U.S. Application Data

[63] Continuation of Ser. No. 50,675, Apr. 21, 1993, abandoned.

[51] Int. Cl.$^6$ ................................................ G11B 7/135
[52] U.S. Cl. ................................................ 369/244; 369/44.19
[58] Field of Search ............................ 360/102, 103, 360/114; 369/244, 44.22, 119, 112, 44.14, 17, 19

[56] References Cited

U.S. PATENT DOCUMENTS

| | | | |
|---|---|---|---|
| 3,829,622 | 8/1974 | Elliot | 360/103 |
| 4,004,081 | 1/1977 | Zorn | 360/103 |
| 4,804,835 | 2/1989 | Ando | 369/110 |
| 4,969,137 | 11/1990 | Sugiyama et al. | 369/112 |
| 5,140,569 | 8/1992 | Nebashi | 360/103 |
| 5,255,260 | 10/1993 | Yamada et al. | 360/103 |

*Primary Examiner*—Robert S. Tupper
*Assistant Examiner*—George J. Letscher
*Attorney, Agent, or Firm*—Blakely, Sokoloff, Taylor and Zafman

[57] ABSTRACT

An optical recording system having a routing prism and an objective lens bonded together with a slider to form an integrated unit. A slider is attached to the end of an arm of a rotary actuator. Housed within the slider is a prism and an objective lens. The prism directs a laser beam downwards through the objective lens which focuses the laser beam onto the surface of an optical disk.

5 Claims, 4 Drawing Sheets

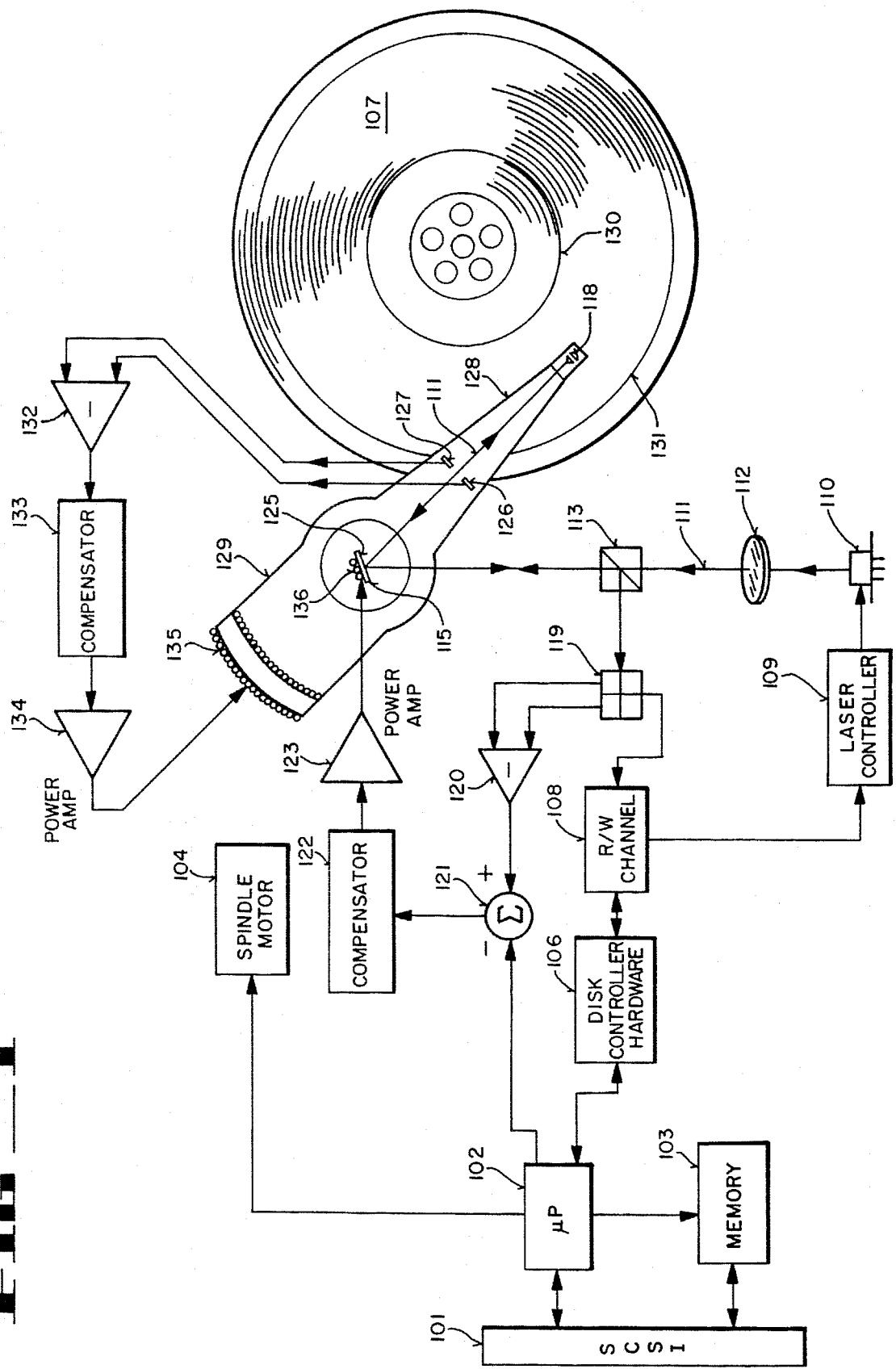

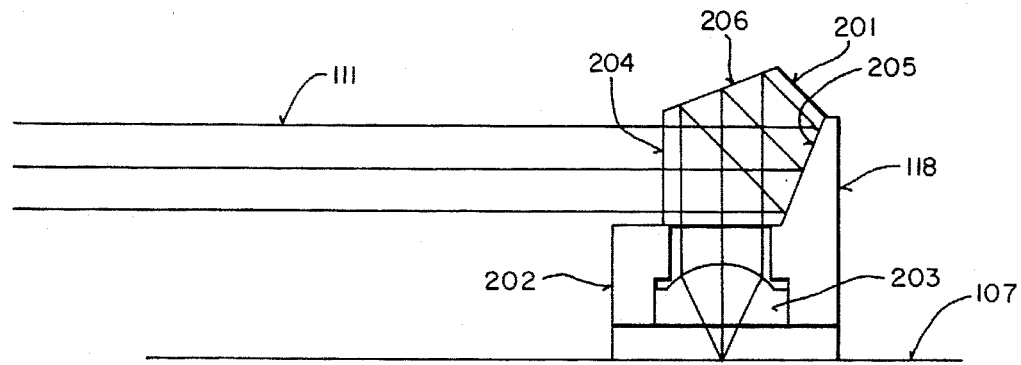
FIG_2
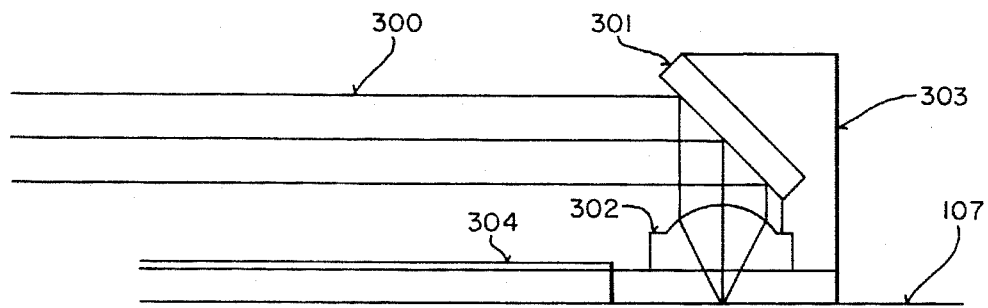
FIG_3
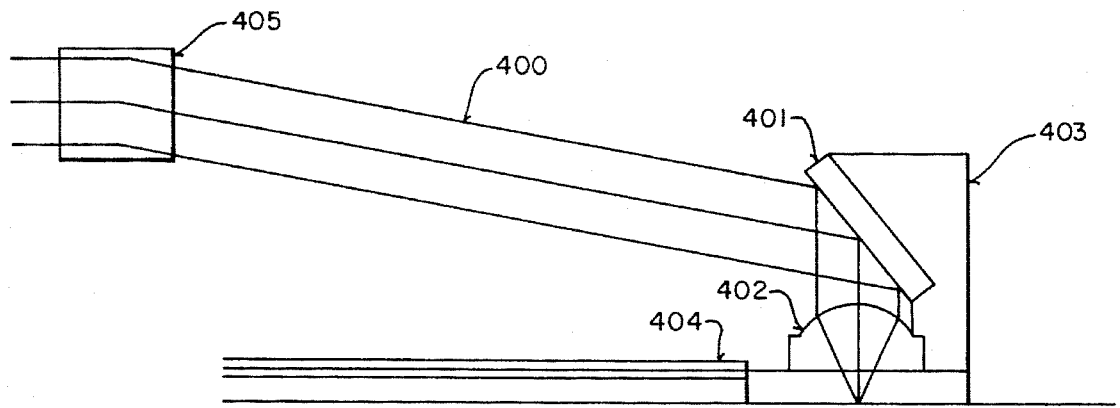
FIG_4

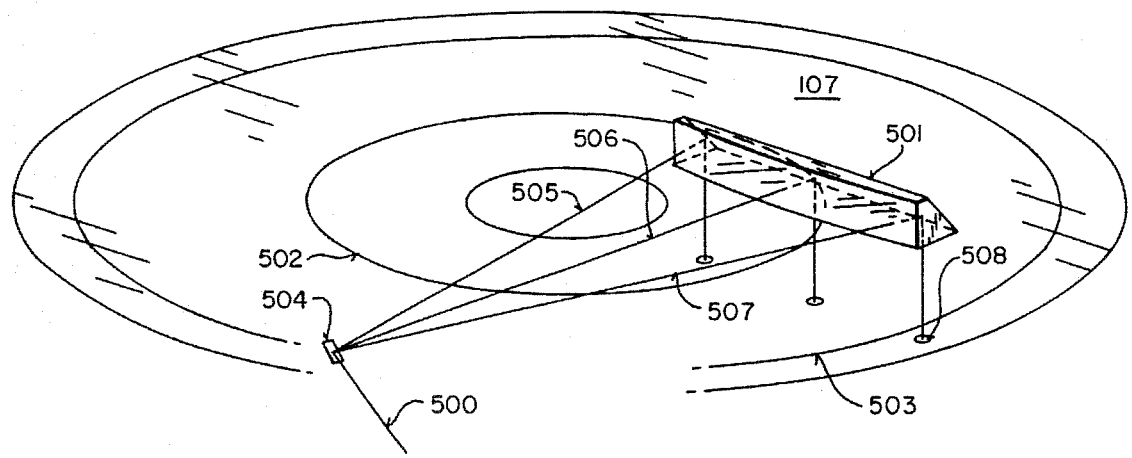
FIG_5
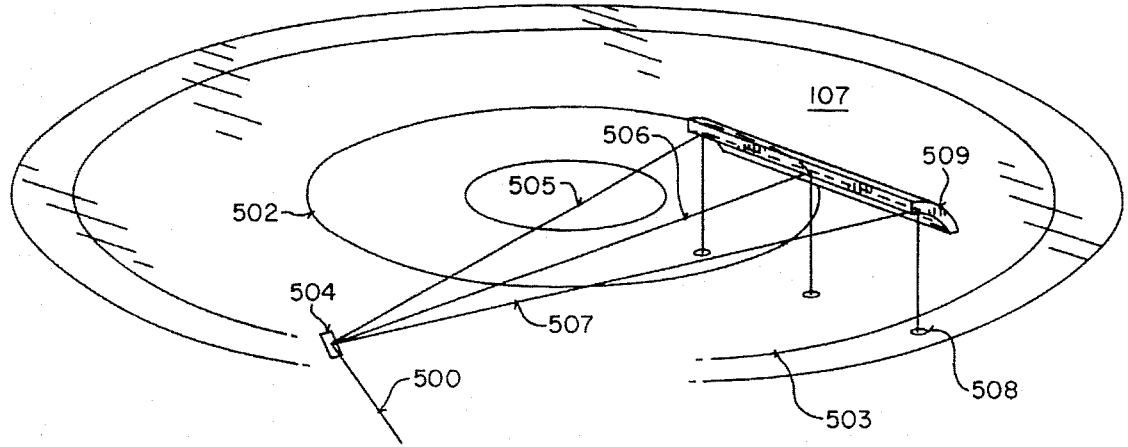
FIG_6

FIG_7
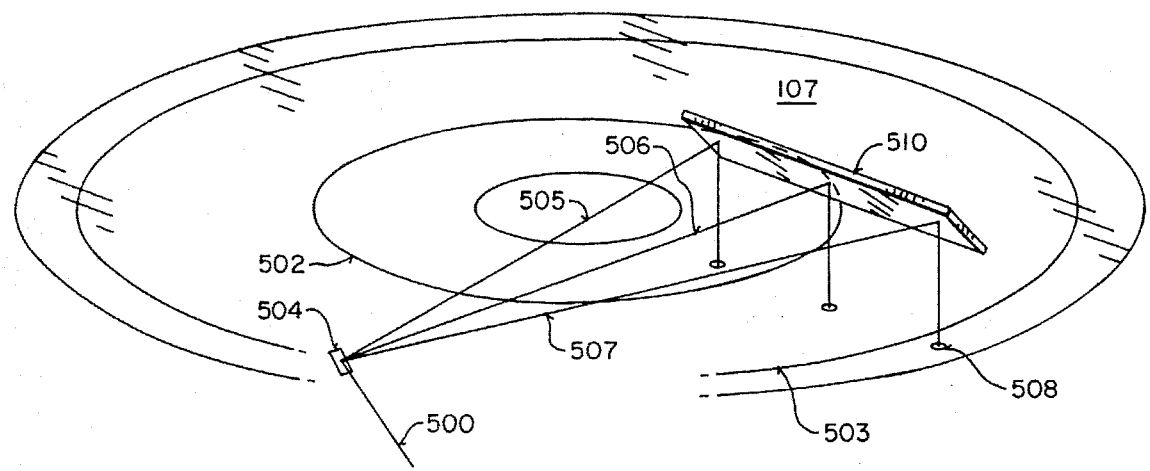

ACTUATOR HAVING A MINIMIZED PAYLOAD IN A OPTICAL RECORDING SYSTEM

This is a continuation of application Ser. No. 08/050,675, filed Apr. 21, 1993, now abandoned.

FIELD OF THE INVENTION

The present invention pertains to the field of optical recording systems. More particularly, the present invention relates to minimizing the payload of an actuator in an optical recording system.

BACKGROUND OF THE INVENTION

Optical-based recording systems such as compact-disk read only memory (CD ROM), video disk, write once read many (WORM), etc., are gaining wide acceptance in the marketplace because of their high storage capacity, random access capability, and relatively low cost. Moreover, erasable optical data storage systems (e.g., magneto-optical disk drives) are now commercially available, wherein old data stored on the optical media can be erased and new data written in place thereof.

The basic principle underlying typical optical recording systems involves the use of a light beam to write data to and read data from an optical medium. Typically, data is represented as a series of digital bits. A light source, such as a laser, is focused and directed by a lens assembly onto a circular optical disk. The disk is rotated about a spindle. By pulsing the laser, data is stored digitally onto the spinning optical disk. Subsequently, the stored data is read from the optical disk by detecting the light beam reflected from the optical disk.

A servo mechanism is used to locate the light beam in reference to fixed radial locations over the disk surface. Hence, the light beam is repositioned among numerous radial positions. As the servo mechanism sequentially moves the light beam radially across the spinning optical disk, a spiral, nearly-concentric circular groove, referred to as a "track," is described on the optical disk. It is onto the surfaces of these tracks that digital information is stored.

Accessing a different track involves utilizing the servo mechanism to position the lens assembly so that the beam is focused onto the target track. This process is known as a "seek." Often, data is written in a random manner. Consequently, a number of seeks are performed for a single disk access. Since data cannot be written onto nor retrieved from the disk when a seek is in progress, it is important to complete the seek as fast as possible in order to minimize undue delays.

In many prior art optical recording systems, the laser and the detector along with the lens assembly are moved as a package when performing a seek. Although this simple, straightforward seek method is precise, it is extremely slow. The laser, detector, and optics package constitutes a relatively large mass which renders it rather difficult to accelerate and decelerate quickly. In other words, this type of actuator has a relative long seek time due to its weight. Moreover, moving such a heavy package entails excessive power consumption. For portable, battery-operated systems, conserving power is critical.

One prior art method for reducing the payload of the actuator involves maintaining the laser and detector at fixed, stationary locations. Only the lenses and mirrors are moved in order to direct the light beam onto a desired track for a seek. Typically, the light generated by the laser is collimated and directed radially, parallel to the surface of the disk. A routing mirror is used to reflect the light beam downward towards the disk. An objective lens focuses the light beam onto the disk's surface. A seek is performed by moving the routing mirror in conjunction with the objective lens over radial locations of the disk.

Typically, either a linear or rotary type actuator is used to position the objective lens according to the servo mechanism. The routing mirror is held directly above the objective lens with an additional arm attached to the actuator. This additional arm adds to the mass of the payload which must be moved by the actuator. The additional weight causes the seek time to increase. Furthermore, it is important to maintain the mechanical and structural integrity of the arm so that it can withstand repeated start/stop shocks during seeks. Hence, the arm must be made relatively thick. The increased weight also contributes to excessive power consumption. Moreover, when the actuator comes to an abrupt stop at the destination track, the arm tends to vibrate. The setting time required for the vibration to subsist introduces an additional delay.

Therefore, what is needed is an apparatus and method for minimizing the payload to be moved by the actuator. It would be highly preferable if the requirement of having an additional arm to hold the routing mirror could be eliminated. Also, there is a need for directing the beam down towards the disk without requiring the use of a routing mirror in order to minimize the payload. Furthermore, there is a need in the prior art for minimizing parasitic mechanical resonances and system power dissipation.

SUMMARY AND OBJECTS OF THE INVENTION

In the present invention, the payload to be moved by an actuator of an optical disk drive is minimized by bonding the routing mirror and an objective lens together to form an integrated unit. In the currently preferred embodiment, a pentaprism is substituted in place of the routing mirror. The pentaprism is used to direct a laser beam downwards through the objective lens which focuses the laser beam onto an optical disk. The pentaprism and the objective lens are bonded and housed within a slider attached to the end of an arm of a rotary actuator. By integrating the pentaprism and objective lens to the slider, the payload is minimized while mechanical rigidity is improved.

In an alternative embodiment, a stationary routing prism bar is attached over the disk. The prism bar extends from the inner to outer diameter of the disk. The prism bar replaces the routing mirror on the actuator and directs the laser beam down towards the disk. Only the objective lens need be moved to track the movement of the laser beam during a seek. Hence, the actuator need not move a routing mirror.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates an optical recording system of the present invention.

FIG. 2 is a side view showing an integrated pentaprism/ objective lens assembly.

FIG. 3 is a side view illustrating a routing mirror.

FIG. 4 is a side view illustrating an integrated routing mirror.

FIG. 5 shows an alternative embodiment of the present invention incorporating a stationary routing prism bar.

FIG. 6 illustrates another alternative embodiment of the present invention.

FIG. 7 illustrates yet another embodiment of the present invention.

DETAILED DESCRIPTION

An actuator having a minimized payload in an optical recording system is described. In the following description, numerous specific details, such as lens assemblies, actuator types, galvo systems, etc., are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The following description of the present invention is made in reference to a rotary type actuator. However, the present invention can be applied equally as well to a linear type actuator.

Referring to FIG. 1, an optical recording system upon which the present invention can be applied is shown. The optical recording system can include a small computer standard interface (SCSI) 101, which provides an interface between the optical recording system and external equipment, such as a computer. The SCSI interface 101 is coupled to a microprocessor 102 and to memory 103. Microprocessor 102 is coupled to and controls the spindle motor 104, servo mechanism, and disk controller hardware 106 per a program stored in memory 103. Spindle motor 104 rotates disk 107 about a spindle. The servo mechanism generates a servo signal which instructs the actuator system on the positioning of the read/write light beam for performing a seek. Disk controller hardware 106 receives data signals read from the media 107 through read/write channel 108. The read data is converted into a byte format and is transmitted to the host computer via SCSI 101.

When data is to be written to media 107, the disk controller hardware 106 converts the data into a format compatible for storage, such as a (2,7) encoding scheme. The data signal is sent to read/write channel 108 which instructs laser controller 109 to control the power of laser pen 110. The same laser pen 110 is used to generate both the light beam used to write data onto the media 107 and the light beam reflected off media 107 for read-back of data from media 107. By controlling the spindle motor 104, the servo mechanism, and laser 110, the microprocessor 102 can effectively perform seeks to different tracks for read/write operations.

Laser pen 110 emits light which is manipulated by collimator 112 into a beam. 111. The collimated light beam 111 passes through beam splitter 113. The light beam continues on its path and strikes galvo mirror 115, which reflects the beam downwards towards media 107 and focused onto the surface of media 107 by integrated prism/objective lens assembly 118.

This same light beam is used to both write data onto media 107 and read data from media 107. When data is being written onto media 107, laser pen 110 generates a strong, high intensity light beam. When reading data, a weaker, less powerful light beam is directed onto media 107. The modulated light reflected back from media 107 passes through integrated pentaprism/objective lens assembly 118 and is reflected back off surface 125 of galvo mirror 115. Galvo mirror 115 directs the reflected light towards beam splitter 113. The function of beam splitter 113 is to route the reflected light to data and servo detector 119. Detector 119 converts the light reflected from media 107 into an electrical signal. This resultant electrical signal contains data stored on the media 107. It is sent via read/write channel 108 to disk controller hardware 106, which converts it into a byte format recognized by the host computer.

The electrical signal from detector 119 also contains information regarding the position of the light beam spot. A diffraction pattern from the grooves corresponding to the tracks causes the light imaged back from media 107 to have an intensity distribution which is a function of the spot relative to the nearest track center. In other words, the electrical signal output from detector 119 is a function of the relative difference of the position of the light beam's spot to the nearest track center. For example, if the focus spot is positioned in the center of a track, the tracking error signal (TES) is zero. As the focus spot is moved away from the center point and towards a track boundary, the amplitude of the TES increases. This electrical signal is known as the tracking error signal (TES). The TES is amplified by difference amplifier 120. The amplified TES signal is input to summer 12 1 to be summed with the servo control signal provided by microprocessor 102. Hence, the signal output from summer 121 represents the difference in distance between the present physical location of the spot relative to that of the destination track. The signal output from summer 121 is input to a loop compensator 122 which is used to determine the proper amount of current required to drive the galvo tracking motor coil 136. Power amplifier 123 is used to amplify the signal from compensation network 122 to the galvo tracking motor coil 136.

The galvo actuator rotates the galvo mirror 115 which, in turn, causes the light beam to sweep radially across media 107. As galvo mirror 115 is rotated, the light beam is swept radially across media 107.

Two elements 126 and 127 are mounted onto an arm 128 of rotary actuator 129. The two elements 126 and 127 are mounted on either side of light beam 111. As the light beam 111 is swept radially from the inner diameter 130 to the outer diameter 131 of media 107, the light beam hits element 126. Conversely, if light beam 111 is swept from outer diameter 131 to inner diameter 130, it hits element 127. When the light beam hits either one of the elements 126 and 127, it causes that element to generate an electrical signal, known as the lens position signal (LPS), which is sent to difference amplifier 132. Based on the amplified LPS signal input to compensator 133, a current required to drive the rotary actuator coil 135 is generated by compensator 133. Power amplifier 134 amplifies the signal output from compensator 133, and the amplified output is coupled to voice coil 135. Basically, rotary actuator 129 operates on the same principles as the galvo actuator described above.

The current supplied to voice coil 135 causes rotary actuator 129 to rotate about a pivot point. This causes arm 128 to, likewise, rotate. In essence, movement of the rotary actuator 129 is slaved to that of the light beam 111. Attached to the tip of arm 128 is the pentaprism 118. Thereby, pentaprism 118 is caused to follow the movement of light beam 111 during a seek. In short, seek operations are performed closed loop. During a seek, the galvo actuator moves the light beam to the centers of each track from take-off to landing. This causes a position or angle offset between the optics (i.e., lens) axis and the laser beam axis. The offset is detected and an LPS signal is generated. Slaved by the LPS, the rotary actuator drives the objective lens to catch up with the light beam.

FIG. 2 is a side view showing integrated pentaprism/objective lens assembly 118. Assembly 118 is comprised of pentaprism 201, slider 202, and objective lens 203. Pentaprism 201 is a five-sided prism and acts as a routing mirror by deflecting the light beam 111 traveling parallel to the surface of the disk 107 downwards, perpendicular to disk 107. The pentaprism reflects the input beam so that the output is 90°. This function is independent of the vibration/rotation of the pentaprism.

When writing data to disk 107, light beam 111 initially enters pentaprism 201 through surface 204 and is deflected by surface 205 to surface 206. Upon striking surface 206, light beam 111 is deflected downwards towards objective lens 203. Pentaprism 201 can be crated by any major optical manufacturer, such as Pentax, Nikon, etc.

Objective lens 203 focuses light beam 111 from pentaprism 201 to the surface of disk 107. The light beam 111 is modulated and reflected back by disk 107, through objective lens 203, to surface 206 of pentaprism 201. Thereupon, the light beam 111 is reflected off of surface 118 and directed back towards the galvo mirror, parallel to disk 107.

Pentaprism 201 and objective lens 203 are bonded with slider 202 to form one integral part. In one embodiment, UV adhesives are used to perform the bonding. The rotation of disk 107 causes slider 202 to be lifted above the surface of disk 107. This lifting phenomenon results from the flow of air produced by the rotating magnetic disk 107. It is this cushion of air flow which causes the slider 202 to "fly" above the surface of disk 107. The body of slider 202 can be made of various ceramic or composite materials. Some examples include alumina and titanium-carbide, stabilized zirconia, aluminum and titanium nitrites, alumina, and silicon-carbide, etc. Depending on the physical layout of the particular optical recording to which the present invention is applied, care must be taken in the design of the flying slider in order to accommodate the pentaprism/objective lens to avoid head crashing.

In an alternative embodiment, the slider is designed to accommodate a routing mirror rather than a pentaprism. FIG. 3 is a side view illustrating a routing mirror 301 and objective lens 302 bonded together with slider 303. In a read/write operation, the light beam 300 is reflected downwards by routing mirror 301 through objective lens 302 towards disk 107. Slider 303 is attached at the end of a flexure 304.

Note that although the present invention of bonding the pentaprism to the objective lens to form one integral part is particularly effective in an actuator system where the fine focusing function is accomplished by an objective lens attached to a Winchester flying slider, it can also be applied to linear actuator systems. However, in a split head linear actuator system, the laser beam sent to the routing mirror from the fixed optics has to be parallel to the surface of the disk because of its nature of the variable optical path length. In a split head rotary actuator system, the optical path length is constant from the inner to outer diameter of the disk. As a result, the light beam to the routing mirror and/or the pentaprism need not be in parallel to the disk's surface.

FIG. 4 is a side view illustrating an integrated routing mirror 401, objective lens 402, and slider 403. Slider 403 is attached to the end of flexure 404. Note that the light beam 400 is at an angle relative to disk 107. The galvo mirror 404 can be placed relatively higher than the slider 403. Alternatively, galvo mirror 405 can also be placed relatively lower than slider 403. The height of the galvo mirror 405 relative to routing mirror 401 determines the angle at which routing mirror 401 is bonded with slider 403.

FIG. 5 shows an alternative embodiment for minimizing the payload by implementing a stationary routing prism bar 501. In a rotary actuator system, the light beam sent to the routing mirror is perpendicular to the trajectory of the objective lens. Consequently, a stationary routing prism bar 501 extending from the inner diameter 502 to the outer diameter 503 of disk 107 can be employed. Prism bar 501 is fixedly mounted above and radial to the surface of disk 107. The light beam 500 is directed to various tracks of disk 107 by rotating the galvo mirror 504. For example, light beam 500 can be reflected to one of the three paths 505–507 by rotating galvo mirror 504. Prism bar 501 directs the light beam down through an objective lens 508 onto disk 107. The objective lens is moved to track the movement to galvo mirror 504 and light beam 500. The objective lens can be housed in a slider of a Winchester type rotary actuator.

In the currently preferred embodiment, objective lens 508 is of a monocentric ball lens type. Equivalent designs will function provided that they have a relatively large angular field of view. The routing prism bar 501 can be either straight or curved. If the prism bar is in the form of an arc (prism 509 in FIG. 6), its surface is cylindrical, and the light beam will need to have cylindrical correction in order to maintain the wavefront quality. The prism bar should be maintained at approximately 20–30% field factor. Prism bar 501 or 509 can be manufactured by any major optical supplier such as Nikon, Pentax, etc.

Since the prism bar 501 remains stationary, the actual payload to be moved by the actuator is minimized. In other words, the mass of the routing mirror and the arm used to hold the routing mirror can be eliminated from the payload. This improves the actuator's performance in both acceleration capability and mechanical resonance.

In an alternative embodiment, an elongated mirror 510 can be substituted for the prism bar. This embodiment is shown in FIG. 7. The mirror 510 would be fixedly attached over the disk and extends from the inner to outer diameter of the disk.

Thus, an actuator having a minimized payload in an optical recording system is disclosed.

What is claimed is:

1. An optical recording system comprising:

a circular optical disk for storing digital data, said disk having a plurality of concentric data tracks extending radially from an inner diameter to an outer diameter;

a laser for generating a light beam used to read data from said disk and write data to said disk;

a mirror for reflecting said light beam over said disk and directing the light beam over the disk;

an objective lens for focusing said directed light beam on said disk;

a rotary actuator attached to said objective lens for tracking the movement of said mirror;

a galvo for rotating said mirror about a pivot point;

a stationary prism fixedly attached above and extending from said inner diameter to said outer diameter of said disk, said prism directing said light beam reflected from said mirror through said objective lens onto a selected one of said plurality of data tracks of said disk.

2. The optical recording system of claim 1 wherein said prism comprises a pentaprism.

3. The optical recording system of claim 2 wherein said prism comprises a curved bar extending from said inner diameter to said outer diameter of said disk.

4. The optical recording system of claim 1 wherein said prism has at least a 20% field factor.

5. The optical recording system of claim 4 wherein said prism comprises a pentaprism.

* * * * *